Jan. 26, 1965 D. J. MARSHALL 3,167,331
HOSE COUPLING CONNECTION
Filed June 1, 1962
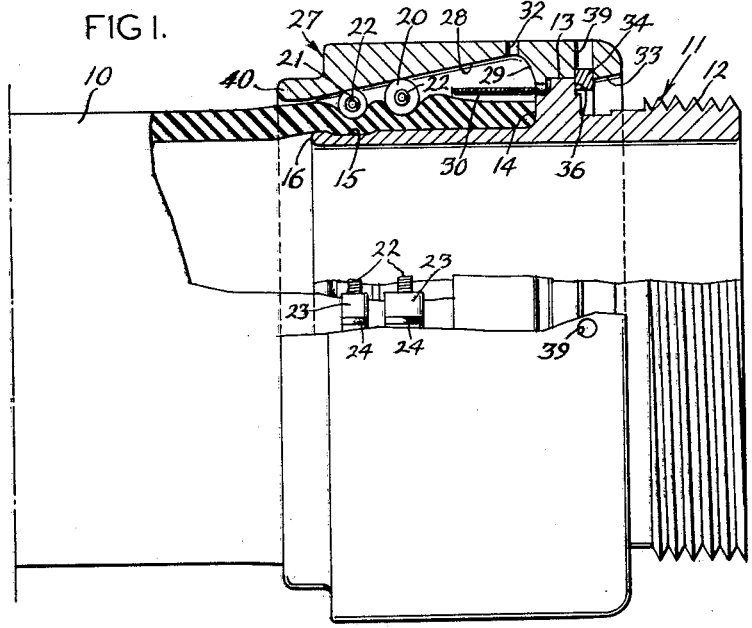
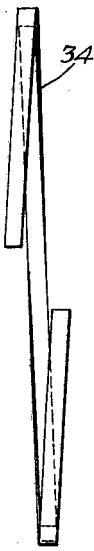
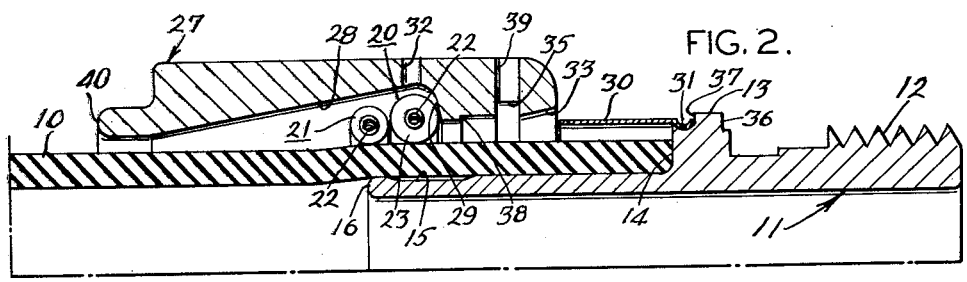
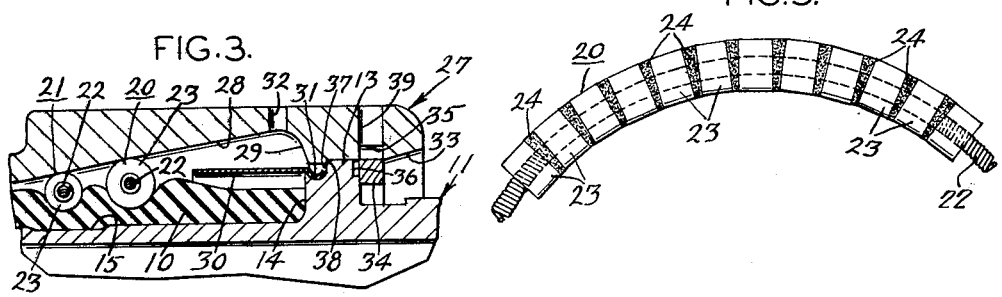
INVENTOR:
DON J. MARSHALL
BY
Howson & Howson
ATTYS.

United States Patent Office 3,167,331
Patented Jan. 26, 1965

3,167,331
HOSE COUPLING CONNECTION
Don J. Marshall, Edgewater, Md., assignor to Dixon Valve & Coupling Company, Philadelphia, Pa., a corporation of Pennsylvania
Filed June 1, 1962, Ser. No. 199,304
9 Claims. (Cl. 285—27)

This invention relates to a hose coupling connection and has for an object the provision of a hose-to-nipple connection, as for a coupling, which will provide a very secure attachment for the hose; which will not cut or damage the hose; which can be very quickly and easily assembled; which will not tend to work apart; and which can be readily taken apart if desired.

The connection includes a rolling annulus or grip ring together with means in the form of a tapered collar or sleeve for wedging the annulus down on the hose and means for dividing the action between a plurality of axially spaced gripping rings. The invention also includes improved means for locking the parts of the connection together.

The objects of the invention as well as various features of novelty and advantages will be apparent from the following description of an exemplary embodiment of the invention, reference being made to the accompanying drawings, wherein:

FIG. 1 is a side elevation and section of a coupling connection embodying the invention, a hose being shown in final connected position;

FIG. 2 is a similar section before the connection is made;

FIG. 3 is a section like the upper part of FIG. 1 but showing a pre-final position of parts with a locking ring being inserted;

FIG. 4 is a side elevation of a locking ring;

FIG. 5 is an elevation of a portion of one of the rolling gripper rings shown in FIG. 1.

As shown in the drawings, a hose 10 is connected to a nipple 11 which is provided with some means, threads 12 being shown, for securing it in some assembly. The usual assembly is a hose coupling with a similar mating hose connection and means for securing the coupling parts together; but the invention is fully disclosed by showing one part of the coupling, so it is not necessary to show the other one or the means for securing them together.

The nipple is provided with an annular external rib 13 having a radial surface 14 which is adapted to be engaged by the end of the hose. The nipple is also provided with a shallow and rather long annular recess 15 on the outer side near the end into which the hose material can be squeezed for sealing without damage to the inner lining when connected. The end of the nipple is rounded, as indicated at 16, to avoid cutting the hose.

A rolling annulus or grip ring is provided for gripping the hose on the coupling. There may be more than one of these and in the present instance two are shown. The first with the larger annulus section, which is referred to by the numeral 20, will be designated as the primary gripper or holding grip ring; and the other, which is referred to by the numeral 21 will be designated as the secondary gripper or sealing grip ring.

Each annulus or grip ring 20, or 21, is stretchable and compressible circumferentially so as to assume various annulus diameters, in the present case this character being imparted by an annular spring wire coil 22 which is connected together at its ends. On this spring wire annulus there are threaded a plurality of generally cylindrical rollers 23 of any suitably rigid material, one example being aluminum, with alternating disks 24 of elastomeric material, such as rubber, neoprene, or the like.

A sleeve or collar 27 has the annulus or annuli grip rings 20, 21 inserted and the collar is pushed on the hose before the hose is pushed on the nipple. The sleeve 27 is provided with an annular tapered or frusto-conical surface 28 which functions to wedge the annular grip rings 20, 21 down on the hose with a rolling action. An annular radial surface 29 on an inwardly extending rib on the sleeve limits the movement of the grip ring within the sleeve in one direction and assures that it is located in a proper initial position.

An annular index and hose enclosing band 30 is provided on a seat 31 on the rib 13 of the nipple, and is secured thereon, for example, as by being punch-staked at various points around its circumference. Holes 32 are provided in the sleeve around its circumference for drainage.

There is sufficient space between the inner surfaces of the sleeve 27 and the hose 10 for the band 30 to enter the sleeve when the parts are secured together.

There is enough space inside the end surface 33 for a snap lock ring 34 to be inserted, the surface 33 being tapered for easy insertion of the ring after the parts have been assembled. Initially this lock ring, which is springy, is spread apart axially at its ends. The ring 34 fits in a groove 35 in the sleeve and can enter this groove when the sleeve is fully pulled up on the nipple, as shown in FIG. 3. One edge of the ring will engage an annular radial surface 36 on the rib 13 if the parts later begin to move apart axially. An annular shoulder at the inner edge of the radial surface 36 prevents the ring from moving back radially inwardly after being installed. Annular radial surfaces 37 and 38 on the nipple 27 and sleeve 10 respectively interengage (FIG. 3) when the parts are fully drawn together to stop further movement. In the final position with the locking ring seated (FIG. 1) the surfaces 37 and 38 are spaced slightly apart.

Holes 39 are provided in the sleeve above the locking ring groove 35 for the insertion of a tool to push the locking ring inwardly for releasing it when making a disassembly. Since the ring is axially resilient it will spring out when pushed in.

In making the assembly the parts are pre-assembled as described, then the sleeve is pulled up on the nipple and hose. For large sizes a wheel-puller type tool can be used. Since the roller bands are tight on the hose they will remain in position until the tapered surface 28 of the sleeve engages them and rolls them down in wedging position on the hose. Due to the selected difference in annulus section diameters the bands will be spaced apart axially in final position.

Due to the rigid tapered backing surface of the sleeve the roller bands will at all times penetrate evenly into the hose around its circumference. When the connection has been made, any pull on the hose will make the roller bands penetrate more deeply and hold more securely.

The roller grip rings penetrate the hose evenly and prevent cutting through the hose liner tube and creating a potential leak. The annular groove 15 is cut in the nipple or a tapered nipple may be used, in either case the purpose being to relieve the radially inward pressure on the hose at the secondary grip ring. This creates a situation where the primary grip ring acts to hold the hose and the secondary grip ring acts mainly for sealing. The outer end 40 of the sleeve is spaced away from the hose and rounded so that no breakage-starting cut in the hose can begin here.

The relative form and position of parts, both in initial position and in final position, have great importance in the efficiency and permanency of the coupling. The surface 29 against which the larger ring engages is spaced the correct distance from the end of the sleeve, which is positioned at the end of the gage band 30, to assure that when the parts are fully drawn up, as shown in FIG. 1, the smaller ring will be disposed above the smaller diameter portion or groove 15 of the nipple to perform the sealing action without unduly cutting into the hose and that the larger ring will be positioned above the larger diameter portion of the nipple to perform its gripping action at a point nearer the end of the hose than the point engaged by the smaller ring. The annulus diameters of the rings are so proportioned that the larger ring will be engaged first by the tapered surface of the sleeve and rolled away from the smaller ring as the parts are tightened so as to leave the rings spaced apart in final assembly, as shown in FIG. 1. At no time during the drawing together of the parts is either ring engaged by a radial surface which would hinder the free rolling action of the cylindrical segments of the rings. By having cylindrical segments the gripping action on the hose is spread extensively around the circumference instead of being concentrated at spaced points around the circumference, as would be the case with spherical segment elements heretofore used.

It is thus seen that the invention provides a simple, effective and convenient hose coupling connection which can be easily installed or removed. The connection is very secure and increases in effectiveness as pull on the hose is increased yet with minimum tendency to damage the hose.

While one embodiment of the invention has been described for purposes of illustration, it is to be understood that there may be various embodiments and modifications within the general scope of the invention.

I claim:

1. A hose coupling connection, comprising in combination, a nipple on which the end portion of a hose is telescoped in assembly, said nipple having a radial surface engageable by the end surface of the hose, an annular circumferentially resilient gripper ring surrounding the hose on said nipple, a plurality of segmental generally cylindrical rigid roller elements equally spaced around said ring, circumferentially resilient spacer elements disposed between said segmental roller elements, an annular sleeve embracing said nipple, hose and gripper ring, said sleeve having a frusto-conical tapered surface engageable with the segmental roller elements of said gripper ring to roll them along on the hose and squeeze it upon the nipple, and means for holding the sleeve and nipple together against axial separation in final assembly position.

2. A hose coupling connection as set forth in claim 1, in which said sleeve is provided with an inwardly extending annular rib having a radial surface at the larger end of the tapered surface engageable with said gripper ring in initial assembly position but movable axially away from said gripper ring as the parts are drawn up in tightened assembly.

3. A hose coupling connection as set forth in claim 2, which further includes an index band on said nipple surrounding the end of the hose and telescopic inside the rib of the sleeve for indicating the end position of the sleeve in initial assembly position of parts to obtain proper disposition and maximum holding efficiency of the connection in the final tightened position.

4. A hose coupling connection as set forth in claim 1, in which said nipple has an annular rib beyond the end of the hose, in which said sleeve has an interior annular groove disposed axially inwardly beyond the nipple rib in final assembly, and in which said means for holding the nipple and sleeve together comprises a split locking ring which is resilient circumferentially and axially and which in its free position has its ends spaced apart circumferentially and axially so as to spring out of the groove of the sleeve when pushed inward radially.

5. A hose coupling connection, comprising in combination, a nipple on which the end portion of a hose is telescoped in assembly, said nipple having an outwardly extending annular rib with a radial surface engageable by the end surface of the hose, a plurality of annular circumferentially resilient gripper rings surrounding the hose on said nipple, said gripper rings being of decreasing annulus diameter from the inner end of the hose outward, an annular sleeve embracing said nipple, hose and gripper rings, said sleeve having a frusto-conical tapered surface engageable with said gripper rings to roll them along on the hose and squeeze it upon the nipple, the taper of said conical surface of said sleeve being such with relation to the annulus diameters of said gripper rings as to cause the rings to be spaced apart axially in final assembly, and means for holding the sleeve and nipple together against axial separation in final assembly position.

6. A hose coupling connection as set forth in claim 5, in which said nipple is provided with a portion of reduced diameter near its end, a gripping ring of smaller diameter being positioned above said portion of smaller diameter in final assembly position to seal the hose on the nipple, and a gripping ring of larger diameter being positioned above a larger diameter portion of the nipple to grip the hose on the nipple at a point nearer the end of the hose than the sealing point at said portion of reduced diameter.

7. A hose coupling connection as set forth in claim 5, in which each gripper ring comprises an inner circumferentially resilient supporting core, a plurality of circumferentially spaced rigid cylindrical roller segments turnably mounted on said core, and resilient washer-type spacers between said roller segments.

8. A hose coupling connection as set forth in claim 6, in which each gripper ring comprises an inner circumferentially resilient supporting core, a plurality of circumferentially spaced rigid cylindrical roller segments turnably mounted on sai core, and resilient washer-type spacers between said roller segments.

9. A hose coupling connection, comprising in combination, a nipple on which the end portion of a hose is telescoped in assembly, said nipple having an outwardly extending annular rib with a radial surface engageable by the end surface of the hose, said nipple also having an axially elongated annular groove near its outer end, a plurality of annular circumferentially resilient gripper rings surrounding the hose on said nipple, said gripper rings being of decreasing annulus diameter from the inner end of the hose outward, each said gripper ring comprising a circumferentially extensible core, a plurality of circumferentially spaced rigid cylindrical roller segments turnably mounted on said core and resilient elastic washer-type spacers between said roller segments, an annular sleeve embracing said nipple, hose and gripper rings, said sleeve having a frusto-conical tapered interior surface engageable with said gripper rings to roll them along on the hose and squeeze it upon the nipple, the taper of said conical surface of the sleeve being such with respect to the annulus diameters of the gripper rings as to cause the rings to be spaced apart axially in final assembly, the sleeve having an interior annular rib with a radial surface to position said ribs in initial assembly position, index means to locate said sleeve in proper position in initial assembly, a gripper ring of smaller annulus diameter being located over the groove of the nipple in final assembly to form a seal, and a gripper ring of larger diameter being located over a larger diameter portion of the nipple nearer the end of the hose to grip it more strongly than the smaller diameter gripper ring, and means for holding the sleeve and nipple together against axial separation in final assembly position.

References Cited in the file of this patent

UNITED STATES PATENTS

| | | |
|---|---|---|
| 2,221,064 | Tobler | Nov. 12, 1940 |
| 2,230,115 | Kreidel | Jan. 28, 1941 |
| 2,358,408 | McMurray | Sept. 19, 1944 |
| 2,445,628 | Muller | July 20, 1948 |
| 2,935,343 | Ellis | May 3, 1960 |
| 3,008,736 | Samiran | Nov. 14, 1961 |

FOREIGN PATENTS

| | | |
|---|---|---|
| 162,986 | Austria | Apr. 25, 1949 |
| 1,201,120 | France | July 6, 1959 |
| 670,217 | Germany | Jan. 14, 1939 |
| 1,062,996 | Germany | Aug. 6, 1959 |
| 1,068,069 | Germany | Oct. 29, 1959 |
| 1,092,261 | Germany | Nov. 3, 1960 |
| 714,028 | Great Britain | Aug. 18, 1954 |